United States Patent [19]
Mizushima et al.

[11] Patent Number: 5,612,450
[45] Date of Patent: Mar. 18, 1997

[54] LIQUID CRYSTAL ALIGNING AGENT AND LIQUID CRYSTAL DISPLAY DEVICE

[75] Inventors: Shigeaki Mizushima, Ikoma; Noriko Watanabe, Nara; Hiroko Iwagoe, Yamatokooriyama; Seiji Makino, Tenri; Sigeo Kawamura, Yokohama; Yusuke Tsuda, Yokohama; Nobuo Bessho, Yokohama, all of Japan

[73] Assignees: Japan Synthetic Rubber Co., Ltd., Tokyo; Sharp Corporation, Osaka, both of Japan

[21] Appl. No.: 441,740

[22] Filed: May 16, 1995

[30] Foreign Application Priority Data

May 17, 1994 [JP] Japan .................................. 6-102929

[51] Int. Cl.⁶ .................................................. C08G 73/10
[52] U.S. Cl. .................. 528/353; 528/125; 528/128; 528/172; 528/173; 528/185; 528/188; 528/220; 528/229; 528/350; 428/1; 428/473.5; 359/900; 349/123
[58] Field of Search .................... 428/1, 473.5; 528/353, 528/350, 172, 185, 173, 188, 220, 229, 125, 128; 359/75, 900

[56] References Cited

U.S. PATENT DOCUMENTS

| | | | |
|---|---|---|---|
| Re. 33,342 | 9/1990 | Kohtoh et al. | 528/351 |
| 5,046,822 | 9/1991 | Matsuda et al. | 359/75 |
| 5,298,590 | 3/1994 | Isogai et al. | 528/188 |

FOREIGN PATENT DOCUMENTS

| | | |
|---|---|---|
| 0613037 | 8/1994 | European Pat. Off. . |
| 61-205924 | 9/1986 | Japan . |

*Primary Examiner*—James J. Seidleck
*Assistant Examiner*—P. Hampton-Hightower
*Attorney, Agent, or Firm*—Oblon, Spivak, McClelland, Maier & Neustadt, P.C.

[57] ABSTRACT

A liquid crystal aligning agent comprising a polyamic acid containing an aliphatic and/or alicyclic hydrocarbon group and a polyimide containing an aliphatic and/or alicyclic hydrocarbon group; and a liquid crystal display device using the liquid crystal aligning agent. This liquid crystal aligning agent gives a liquid crystal aligning film which has good liquid crystal aligning property and in which pretilt angle can be changed by radiation with a small energy and which is suitable for domain-divided alignment type liquid crystal display having a wide view angle.

16 Claims, 6 Drawing Sheets

High tilt | Low tilt

Low tilt | High tilt

Application of aligning film A

2 Liquid crystal aligning film A (pretilt angle A)
1 Substrate

Application of aligning film B

3 Liquid crystal aligning film B (pretilt angle B)
2
1

Application of positive resist

4 Positive resist
3
2
1

Exposure

5 Radiation
6 Photomask
4
3
2
1

Development

Removal of resist

FIG. 5

Application of crystal liquid aligning agent

Exposure

After exposure

Lamination (liquid crystal display divice)

FIG. 6

▨▨▨▨ 2 Liquid crystal alignining film A (pretilt angle A)

▩▩▩▩ 7 Modification of liquid crystal aligning film A (pretilt angle C)

FIG. 7

▨▨▨▨ 2 Liquid crystal aligning film A (pretilt angle A)

▩▩▩▩ 7 Modification of liquid crystal aligning film A (pretilt angle C)

FIG. 8

LIQUID CRYSTAL ALIGNING AGENT AND LIQUID CRYSTAL DISPLAY DEVICE

DETAILED DESCRIPTION OF THE INVENTION

This invention relates to a liquid crystal aligning agent for a domain-divided alignment type liquid crystal display device. More specifically, it relates to a liquid crystal aligning agent which is excellent in liquid crystal aligning property when it is formed into a liquid crystal aligning film and which causes changes in the pretilt angle of a liquid crystal by exposure of the liquid crystal aligning film to radiation.

There is conventionally known a liquid crystal display device (to be referred to as "TN-STN display device" hereinafter) having a sandwich structure in which a nematic liquid crystal having positive dielectric anisotropy is sandwiched between substrates composed of a transparent electrode and a liquid crystal aligning film formed of polyimide, etc., and having a TN (twisted nematic) or STN (super twisted nematic) liquid crystal cell in which the major axis of liquid crystal molecules can be continuously twisted in the range of 90° to 270° between the substrates. However, the TN-STN display device has a problem that the view angle of display is narrow particularly for the display of a half tone since the display is switched on and off using the rise and decay of liquid crystal molecules having the anisotropy of refractive index.

Figure 1:
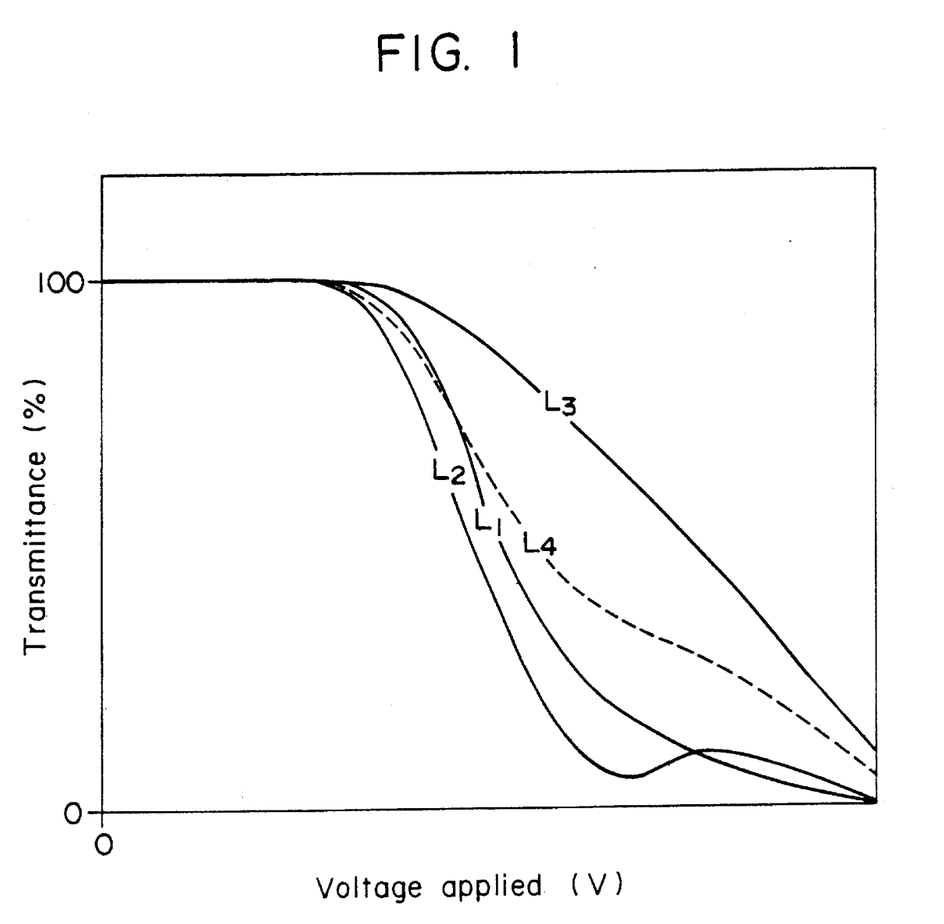
FIG. 1 shows the voltage-transmittance characteristic of a conventional TN-STN display device.

In other words, in a normally white mode of a TN-STN display device which displays white when no voltage is applied, for example, its voltage-transmittance characteristic is shown by $L_1$ of FIG. 1 when it is viewed from the front, and transmittance decreases when voltage applied increases. However, its voltage-transmittance characteristic is shown by $L_2$ of FIG. 1 when it is viewed from the diagonal at an angle in the normal view direction which is the rising direction of a liquid crystal, and this characteristic curve has a domain where transmittance rises as voltage applied increases. The reversal of a tone occurs at this domain so that white and black of an image are reversed. Further, when it is viewed from the diagonal at an angle from the reverse side of the normal view direction, its voltage-transmittance characteristic is shown by $L_3$ of FIG. 1 and a black and white contrast ratio significantly lowers. To overcome this problem, it has been reported that the view angle of display can be broadened by combining two substrates coated with liquid crystal aligning films which show high and low pretilt angles in such a manner that domains having a high pretilt angle and domains having a low pretilt angle face each other between upper and lower substrates to domain-divided alignment type of liquid crystals (SID' 92 Digest, p.798).

Figure 2:
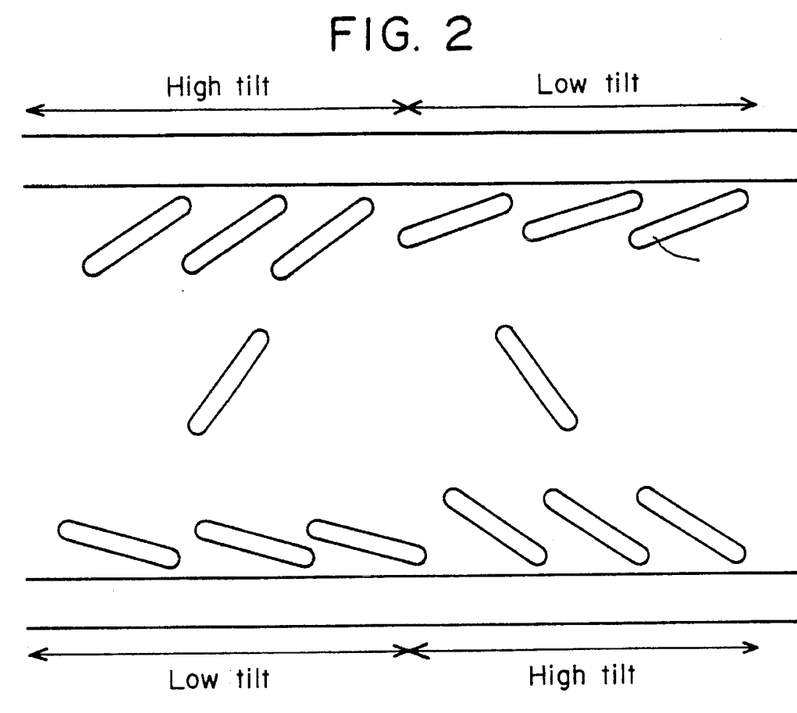
FIG. 2 shows an example of the structure of a liquid crystal display device having liquid crystal aligning films showing high and low pretilt angles, formed on the same substrate.
Figure 3:
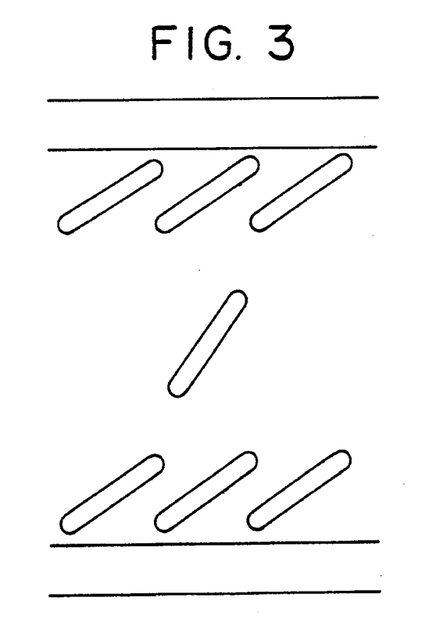
FIG. 3 shows another example of the structure of a liquid crystal display device having liquid crystal aligning films having the same pretilt angle, formed on the same substrate.

When the upper (or lower) domains and the lower (or upper) domains having a high pretilt angle and a low pretilt angle, respectively, are combined together, the liquid crystals turn in the aligning direction of the domain having a high pretilt angle. Making use of this phenomenon, the aligning direction of the liquid crystals is reversed at the domain having a high pretilt angle of the upper substrate and the domain having a high pretilt angle of the lower substrate to obtain a view angle in both normal and reverse directions within each pixel. Thus, view angle characteristic ($L_4$) is uniformized so that excellent display without reversal of black and white colors and a sharp reduction in contrast can be obtained when it is viewed from both normal and reverse sides. An example of the structure of such a liquid crystal display device is shown in FIG. 2. Since the aligning direction is determined optionally by selecting a proper pretilt angle, the structure is not limited to this example. FIG. 3 shows an example of the structure of a conventional liquid crystal display device for comparison.

Figure 4:
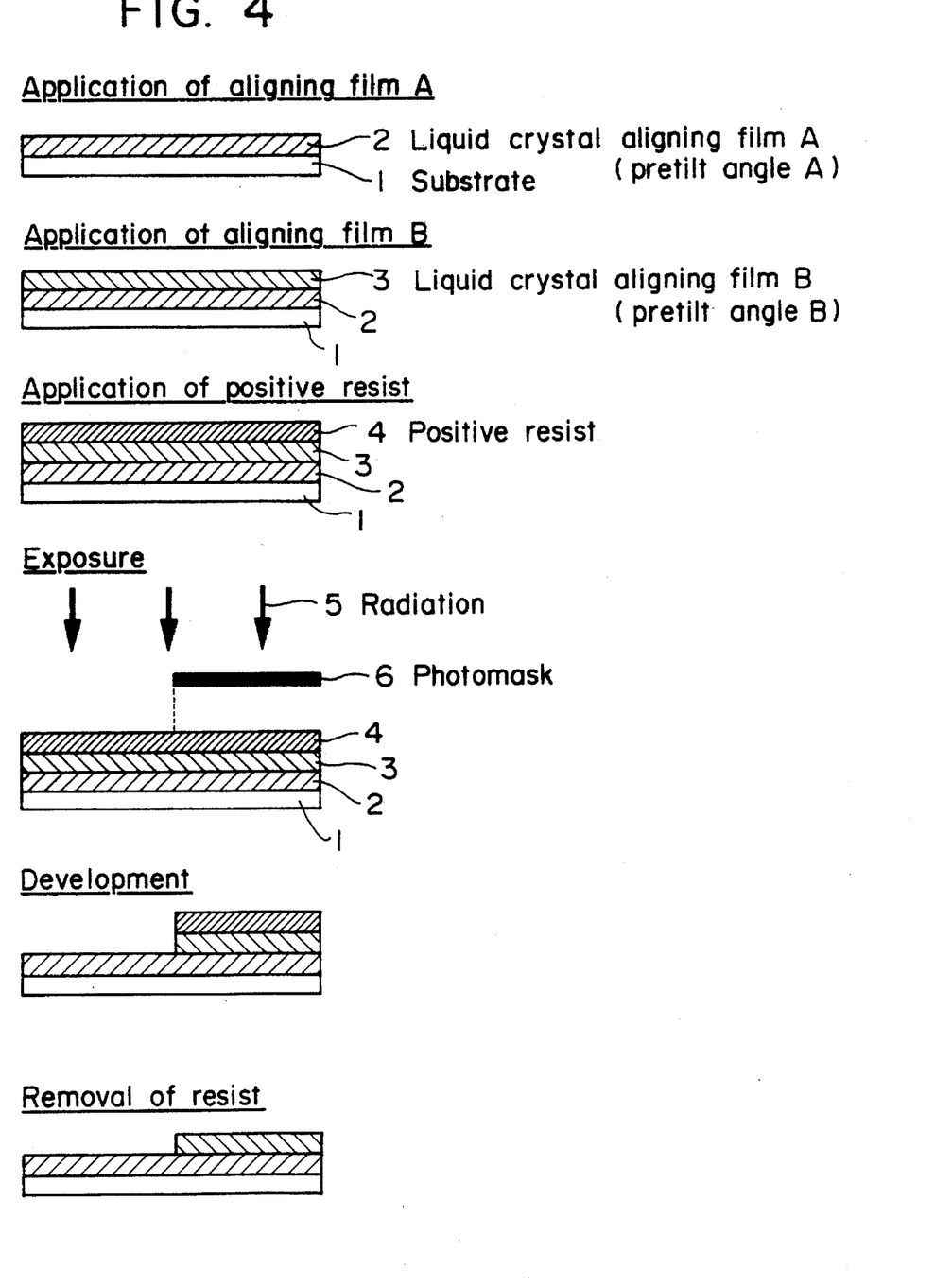
FIG. 4 is a diagram explaining a method for producing liquid crystal aligning films giving high and low pretilt angles on the same substrate using two different liquid crystal aligning agents showing different pretilt angles.

As a method for forming liquid crystal aligning films giving high and low pretilt angles on the same substrate, there is known a method shown in FIG. 4, for example.

A liquid crystal aligning film A is first formed on a substrate. Another liquid crystal aligning film B showing a pretilt angle different from that of the liquid crystal aligning film A is formed on the film A (for instance, a pretilt angle of 7° for the film A and 1° for the film B). Further, a positive resist of an alkali development type is formed on the film B, and exposure and development are carried out through a predetermined pattern to remove exposed domains of the resist and liquid crystal aligning film B.

Thereafter, unexposed domains of the resist are removed to form domains of the liquid crystal aligning film A and domains of the liquid crystal aligning film B, that is, low pretilt angle domains and high pretilt angle domains in accordance with a pattern of exposed and unexposed domains.

The above-described pattern forming method involves such problems as very strict requirements for the liquid crystal aligning films, a complicated production process and deterioration in the electric characteristics of a liquid crystal display device. Therefore, as an alternative for this method, there has been proposed a method for controlling pretilt angle making use of the modification of the liquid crystal aligning film caused by direct exposure of the liquid crystal aligning film formed on the substrate to radiation (see EP 613037A).

However, when a conventional liquid crystal aligning agent is used, pretilt angle is not changed by exposure to radiation in some cases, and even when pretilt angle is changed, a large radiation energy is required to obtain the desired difference in pretilt angles. Therefore, the conventional liquid crystal aligning agent cannot meet requirements for the above-described application.

It is therefore an object of the invention to provide a liquid crystal aligning agent which is excellent in liquid crystal aligning property when it is formed into a liquid crystal aligning film and which is able to cause a change in pretilt angle due to exposure of the liquid crystal aligning film to radiation with a small radiation energy in a short period of time.

Other objects and advantages of the invention will become apparent from the following description.

According to the present invention, the above object and advantage can be attained by a liquid crystal aligning agent for a domain-divided alignment type liquid crystal display device, which comprises a polymer containing at least one structural unit selected from the group consisting of a structural unit (to be referred to as "specific structural unit I" hereinafter) represented by the following formula (1):

wherein $R^1$ and $R^2$ are tetravalent and divalent organic groups, respectively, and at least one of the organic groups is an aliphatic or alicyclic hydrocarbon group, or a group containing an aliphatic or alicyclic hydrocarbon group, and a structural unit (to be referred to as "specific structural unit II" hereinafter) represented by the following formula (2):

wherein $R^3$ and $R^4$ are tetravalent and divalent organic groups, respectively, and at least one of the organic groups is an aliphatic or alicyclic hydrocarbon group, or a group containing an aliphatic or alicyclic hydrocarbon group, and which has the ability to change the pretilt angle of a liquid crystal when a thin films formed from the liquid crystal aligning agent after exposure to radiation is compared that before exposure to radiation.

A polymer (to be referred to as "specific polymer I" hereinafter) mainly containing the specific structural unit I used in the present invention can be obtained by reacting a tetracarboxylic dianhydride with a diamine compound. A polymer (to be referred to as "specific polymer II" hereinafter) mainly containing the specific structural unit II can be obtained by chemically imidizing the structural unit I of the polymer containing the equivalent specific structural unit I thermally or in the presence of a catalyst. In the production of the specific polymer I, an acid anhydride and a monoamine compound may be added for the purpose of controlling the molecular weight of the polymer, improving applicability to the substrate, or providing a pretilt angle. The terminal modified specific polymer I thus prepared and the specific polymer II which is an imidized polymer of the specific polymer I can be used as liquid crystal aligning agents of the present invention without any problem. The aliphatic and/or alicyclic hydrocarbon group(s) to be contained in the specific polymer I and the specific polymer II may be contained in at least one of the tetracarboxylic dianhydride and the diamine compound. Preferably, the group(s) is(are) contained in two or more components.

In the present invention, the proportion of the specific structural unit I and/or the specific structural unit II is preferably 40 to 100 mol %, more preferably 60 to 100 mol %, the most preferably 70 to 100 mol % of the polymer as a liquid crystal aligning agent, from a view of solubility in an organic solvent.

Further, in the present invention, the proportion of the specific structural unit II is preferably 40 to 100 mol %, more preferably 60 to 100 mol %, the most preferably 70 to 100 mol % of the polymer for forming a liquid crystal aligning film of a liquid crystal display device, after baking which will be described hereinafter, from a view of liquid crystal aligning property.

According to the present invention, the specific polymer I is virtually called polyamic acid and the specific polymer II is virtually called polyimide. The specific polymer I is generally represented by the following formula (A):

wherein $R^1$ and $R^2$ are tetravalent and divalent organic groups, respectively, and at least one of the organic groups is an aliphatic or alicyclic hydrocarbon group, or a group containing an aliphatic or alicyclic hydrocarbon group, and n is a number of recurring units.

The specific polymer II is generally represented by the following formula (B):

wherein $R^3$ and $R^4$ are tetravalent and divalent organic groups, respectively, and at least one of the organic groups is an aliphatic or alicyclic hydrocarbon group, or a group containing an aliphatic or alicyclic hydrocarbon group, and n is a number of recurring units.

The specific polymer II contains sometimes the specific structural unit I.

Illustrative examples of the tetracarboxylic dianhydride include aliphatic or alicyclic tetracarboxylic dianhydrides such as butanetetracarboxylic dianhydride, 1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 1,2,3a,4,5,9b-hexahydro-5-(tetrahydro-2,5-dioxo-3-furanyl)-naphtho[1,2c]-furan-1,3-dione, 5-(2,5-dioxotetrahydrofural)-3-methyl-3-cyclohexene-1,2-dicarboxylic dianhydride and bicyclo[2,2,2]-oct-7-ene-2,3,5,6-tetracarboxylic dianhydride; and aromatic tetracarboxylic dianhydrides such as pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3', 4,4'-biphenylethertetracarboxylic dianhydride, 3,3',4,4'-dimethyldiphenylsilanetetracarboxylic dianhydride, 3,3',4, 4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3, 4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic dianhydride, 3,3',4,4'-biphenyltetracarboxylic dianhydride, bis(phthalic)phenylphosphine oxide dianhydride, p-phenylene-bis-(triphenylphthalic) dianhydride, m-phenylene-bis(triphenylphthalic) dianhydride, bis(triphenylphthalic)-4,4'-diphenyl ether dianhydride and bis(triphenylphthalic)-4,4'-diphenylmethane dianhydride. Among these, preferred are 1,2,3,4-cyclobutanetetracarboxylic dianhydride, 1,2,3,4-cyclopentanetetracarboxylic dianhydride, 2,3,5-tricarboxycyclopentylacetic dianhydride, 1,3,3a,4,5,9b-hexahydro-5-(tetrahydro-2,5-dioxo-3-furanyl)-naphtho[1,2c]-furan-1,3-dione, 5-(2,5-dioxotetrahydrofural)-3-methyl-3-cyclohexane-1,2-dicarboxylic dianhydride and bicyclo[2,2, 2]-oct-7-ene-2,3,5,6-tetracarboxylic dianhydride. Particularly preferred are 1,2,3,4-cyclobutanetetracarboxylic dianhydride and 2,3,5 -tricarboxycyclopentylacetic dianhydride. They may be used alone or in combination of two or more.

Illustrative examples of the diamine compound include aromatic diamines such as 3,5-diaminobenzoic acid, 4,4'-diaminodiphenylethane, 4,4'-diaminodiphenylsulfide, 4,4'-diaminodiphenylsulfone, 4,4'-diaminodiphenyl ether, 1,5-diaminonapthalene, 3,3-dimethyl-4,4'-diaminobiphenyl, 4,4'-diaminobenzanilide, 3,4'-diaminodiphenyl ether, 3,3'-diaminobenzophenone, 3,4'-diaminobenzophenone, 4,4'-diaminobenzophenone, 2,2-bis[4-(4-aminophenoxy)phenyl] propane, 2,2-bis[4-(4-aminophenoxy)phenyl] hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 2,7-diaminofluorene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4, 4'-diamono-5,5'-dimethoxybiphenyl, 3,3'-dimethoxy-4,4'-diaminobiphenyl, 1,4,4'-(p-phenyleneisopropylidene)bisaniline, 4,4'-(m-phenyleneisopropylidene)bisaniline, 2,2'-bis [4-(4-amino-2-trifluoromethylphenoxy)phenyl] hexafluoropropane, 4,4'-diamino-2,2'-bis(trifluoromethyl)biphenyl, 4,4'-bis[(4-amino-2-trifluoromethyl)phenoxy]-octafluorobiphenyl and a diamine represented by the following formula (3):

(3)

aromatic diamine having a hetero atom such as diaminotetraphenylthiophene;
aliphatic or alicyclic diamines such as 1,1-metaxylylenediamine, 1,3-propanediamine, tetramethylenediamine, pentamethylenediamine, hexamethylenediamine, heptamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo[6,2,1,0$^{2.7}$]-undecylenedimethyldiamine and 4,4'-methylenebis(cyclohexylamine);
alkyl-substituted phenylenediamines represented by the following formula (4):

(4)

wherein $R^9$, $R^{10}$, $R^{11}$ and $R^{12}$ are independently a hydrogen atom or an alkyl group such as methyl, ethyl or isopropyl, such as p-phenylenediamine and 2,3,5,6-tetramethyl-1,4-diaminobenzene; substituted diphenylmethanes represented by the following formula (5):

(5)

wherein $R^{13}$, $R^{14}$, $R^{15}$, $R^{16}$, $R^{17}$, $R^{18}$, $R^{19}$ and $R^{20}$ are independently a hydrogen atom or an alkyl group such as methyl, ethyl or isopropyl, such as 4,4'-diaminophenylmethane and 3,3'-diethyl-4,4'-diaminodiphenylmethane;
substituted phenylenediamines represented by the following formula (6):

(6)

wherein $R^{21}$ is a divalent organic group selected from the groups consisting of —O—, —COO—, —OCO—, —NHCO—, —CONH— and —CO—, and $R^{22}$ is a monovalent organic group, such as a diamine represented by the following formula (7):

(7)

and having a steroidal skeleton at $R^{22}$;
3,5-diamino-4'-trifluoromethylbenzanilide and 3,5-diamino-3'-trifluoromethylbenzanilide having a trifluoromethylphenyl group;
diaminoorganosiloxane represented by the following formula (8):

wherein $R^{23}$ is a hydrocarbon group having 1 to 12 carbon atoms, i.e., an alkyl group such as methyl, ethyl or propyl, a cycloalkyl group such as cyclohexyl, or an aryl group such as phenyl, p is an integer of 1 to 3, and q is an integer of 1 to 20;

and the like.

Among these, preferred are p-phenylenediamine, 2,3,5,6-tetramethyl-1,4-diaminobenzene, 4,4'-diaminodiphenylmethane, 3,3'-diethyl-4,4'-diaminodiphenylmethane, 1,5-diaminonaphthalene, 2,7-diaminofluorene, 4,4'-diaminodiphenylsulfide, 4,4'-diaminodiphenyl ether, 9,9-bis(4-aminophenyl)fluorene, 2,2-bis[4-(4-aminophenoxy)phenyl]hexafluoropropane, 2,2-bis(4-aminophenyl)hexafluoropropane, 2,2'-bis[4-(4-amino-2-trifluoromethylphenoxy)phenyl]hexafluoropropane, 4,4'-diamino-2,2'-bis(trifluoromethyl)biphenyl, 4,4'-bis[(4-amino-2-trifluoromethyl)phenoxy]-octafluorobiphenyl, 3,5-diamino-4'-trifluoromethylbenzanilide, 3,5-diamino-3'-trifluoromethylbenzanilide and the diamine represented by the above formula (8). Particularly preferred are p-phenylenediamine, 4,4'-diaminodiphenylmethane, 4,4'-diaminodiphenylsulfide, 3,5-diamino-4'-trifluoromethylbenzanilide, 3,5-diamino-3'-trifluoromethylbenzanilide and the diamine represented by the above formula (8). They may be used alone or in combination of two or more.

Preferred examples of the acid anhydride suitable for terminal modification include maleic anhydride, phthalic anhydride and a compound represented by the following formula (9):

Specific examples of the monoamine for terminal modification include aniline, cyclohexylamine, n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, n-eicosylamine and the like.

The aliphatic or alicyclic hydrocarbon group, or the group containing an aliphatic or alicyclic hydrocarbon group at $R^1$, $R^2$, $R^3$ and $R^4$ of the specific structural units I and II of the present invention is derived from the aliphatic or alicyclic tetracarboxylic dianhydride, the aliphatic or alicyclic diamine, or the tetracarboxylic dianhydride or diamine containing an aliphatic or alicyclic hydrocarbon group as described above.

The specific polymer I used in the present invention can be obtained by reacting a tetracarboxylic dianhydride with a diamine compound in an organic solvent at a reaction temperature preferably in the range of 0° to 150° C., more preferably in the range of 0° to 100° C. The amount ratio of the tetracarboxylic dianhydride to the diamine compound is as follows: the amount of the acid anhydride group of the tetracarboxylic dianhydride per equivalent of the amino group of the diamine compound is preferably 0.2 to 2 equivalents, more preferably 0.3 to 1.2 equivalents. An acid anhydride for terminal modification or a monoamine may be added at the time of this reaction, as described above.

The organic solvent is not particularly limited, provided that it can dissolve the specific polymer I formed by the reaction. Illustrative examples of the organic solvent include aprotic polar solvents such as N-methyl-2-pyrrolidone, N,N-dimethylacetamide, N,N-dimethylformamide, dimethylsulfoxide, γ-butyrolactone, tetramethylurea and hexamethylphosphortriamide; and phenolic solvents such as m-cresol, xylenol, phenol and halogenated phenol. The amount of the organic solvent used is preferably set such that the total amount of the tetracarboxylic dianhydride and the diamine compound is 0.1 to 30% by weight based on the total amount of the reaction solution.

The specific polymer II used in the present invention can be obtained by imidizing the above-described specific polymer I under heat in the presence of a dehydrating agent and an imidation catalyst. The reaction temperature for the above imidation under heat is preferably in the range of 60° to 250° C., more preferably in the range of 100° to 170° C. When the reaction temperature is below 60° C., the reaction proceeds slowly and when it is above 250° C., the molecular weight of the specific polymer II is liable to decrease greatly. The imidation in the presence of an dehydrating agent and an imidation catalyst can be carried out in the above-described organic solvent. The reaction temperature is preferably in the range of 0° to 180° C., more preferably in the range of 60° to 150° C. The dehydrating agent is selected, for example, from acid anhydrides such as acetic anhydride, propionic anhydride and trifluoroacetic anhydride. The imidation catalyst is selected, for example, from tertiary amines such as pyridine, collidine, lutidine and triethylamine. The amount of the dehydrating agent used is preferably 1.6 to 20 moles per mole of the recurring unit of the equivalent specific polymer I. The amount of the imidation catalyst used is preferably 0.5 to 10 moles per mole of the dehydrating agent used.

The above-described organic solvent may be used in combination with a poor solvent of the specific polymer II such as an alcohol, a ketone, an ester, an ether, a halogenated hydrocarbon or a hydrocarbon to such an extent that the specific polymer II formed is not precipitated. The poor solvent is selected, for example, from alcohols such as methyl alcohol, ethyl alcohol, isopropyl alcohol, cyclohexanol, ethylene glycol, propylene glycol, 1,4-butanediol, triethylene glycol and ethylene glycol monomethyl ether; ketones such as acetone, methyl ethyl ketone, methyl isobutyl ketone and cyclohexanone; esters such as methyl acetate, ethyl acetate, butyl acetate, diethyl oxalate and diethyl malonate; ethers such as diethyl ether, ethylene glycol methyl ether, ethylene glycol ethyl ether, ethylene glycol-n-propyl ether, ethylene glycol-i-propyl ether, ethylene glycol-n-butyl ether, ethylene glycol dimethyl ether, ethylene glycol ethyl ether acetate, diethylene glycol dimethyl ether and tetrahydrofuran; halogenated hydrocarbons such as dichloromethane, 1,2-dichloroethane, 1,4-dichlorobutane, trichloroethane, chlorobenzene and o-dichlorobenzene; hydrocarbons such as hexane, heptane, octane, benzene, toluene and xylene.

The thus obtained specific polymer I or II has an intrinsic viscosity preferably in the range of 0.05 to 10 dl/g, more preferably in the range of 0.05 to 5 dl/g (when measured under the conditions [ηinh=(ln ηrel/C, C=0.5 g/dl, at 30° C. in N-methyl-2-pyrrolidone), the intrinsic viscosity values which will follow were all obtained under these conditions].

The liquid crystal aligning agent of the present invention may contain a silane coupling agent for the purpose of improving adhesion of the specific polymer I and/or the specific polymer II to the substrate.

Illustrative examples of the silane coupling agent include 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyl trimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonyl acetate, 9-triethoxysilyl-3, 6-diazanonyl acetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, N-bis(oxyethylene)-3-aminopropyltriethoxysilane and the like.

The liquid crystal aligning agent of the present invention may contain additives such as a photosensitizer, a photoradical generator and an agent of forming an acid by light irradiation, to improve sensitivity to radiation.

A coumarine such as 3-benzoylbenzo[f]coumarine (manufactured by Kodak), a ketone-containing compound such as CGI-369 (manufactured by CIBA-GEIGY), and a triazine compound such as 2,4-bis(trichloromethyl)-6-(4'-methoxynaphthyl)-s-triazine are typical examples of the photosensitizer, photoradical generator and agent for forming an acid by light irradiation, respectively.

The liquid crystal aligning agent of the present invention shows the ability to change the pretilt angel of a liquid crystal when a thin film formed from the liquid crystal aligning agent after exposure to radiation is compared with that before exposure to radiation.

Figure 5:
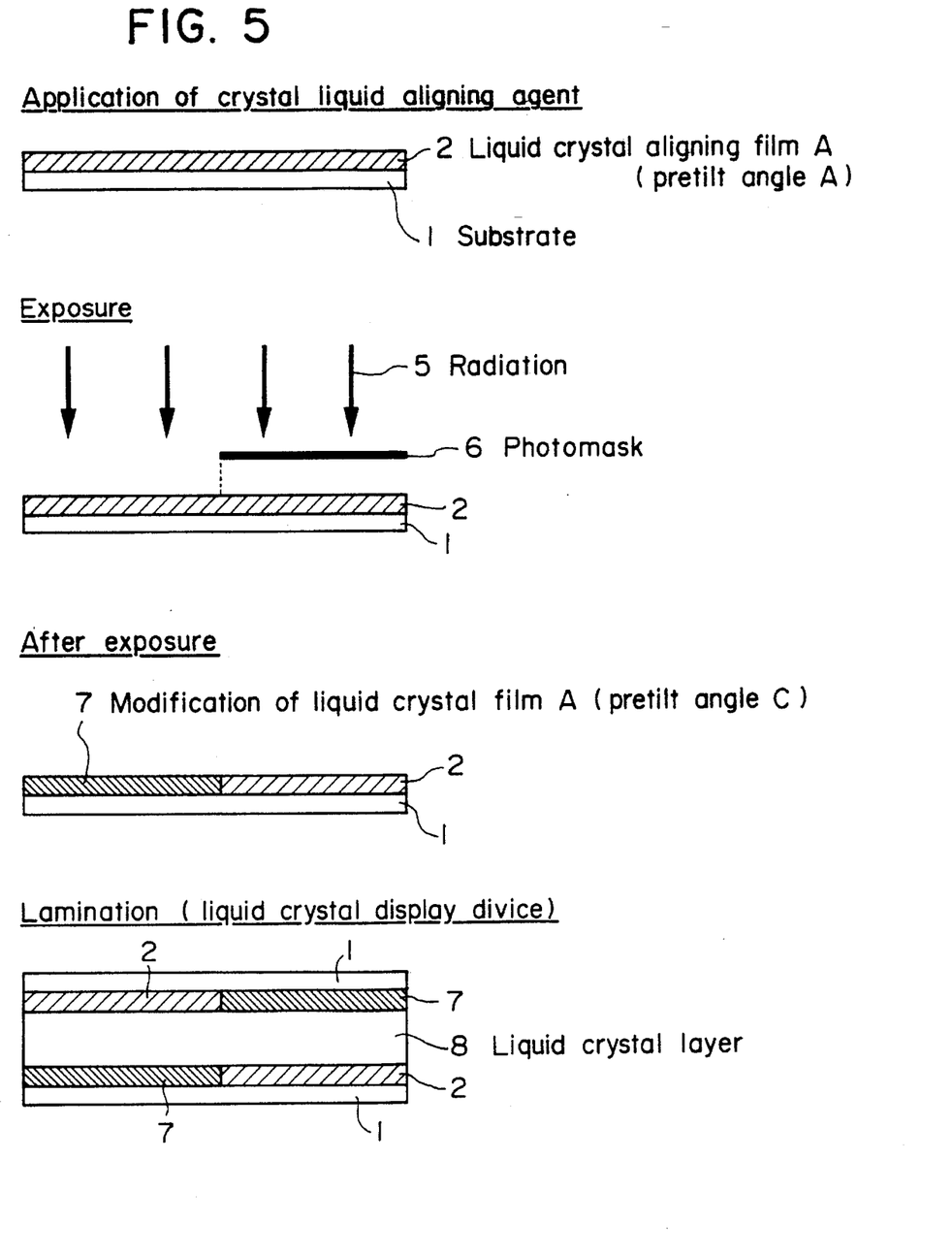
FIG. 5 is a diagram explaining a method for producing a domain-divided alignment type liquid crystal display device to which the liquid crystal aligning agent of the present invention is applied.

Making use of this property of the liquid crystal aligning agent of the present invention, a liquid crystal display device of a domain-divided alignment type can be produced by the following method, for example (see FIG. 5).

The liquid crystal aligning agent of the present invention is first applied to the transparent electrically conductive film side of a substrate having the transparent electrically conductive film by any one of a roll coating method, a spinner method and a printing method, and pre-baked at 60° to 100° C., for example. Then, the thus obtained liquid crystal aligning film is exposed partly to, for example, an ultraviolet ray through a mask having a predetermined pattern, and then post-baked at a temperature of 120° to 300° C., preferably 130° to 250° C. The thickness of the resulting coating is usually 0.001 to 1 μm, preferably 0.005 to 0.5 μm. The pretilt angle of an exposed domain differs from that of an unexposed domain. The appropriate difference of pretilt angles in one pixel is 2° to 10°.

The radiation is not particularly limited, provided that it induces the above-described modification of the thin film, and an ultraviolet ray, an electron beam, an X-ray and a laser beam may be used. Among these, preferred is radiation having a wavelength of 300 nm or less. An ultraviolet ray generated from a metal halide lamp, mercury xenon lamp, low-pressure mercury lamp, high-pressure mercury lamp or the like as a light source is particularly preferred from a view of possible batch exposure.

The above-formed coating is subjected to a rubbing treatment with a roll wrapped with a cloth of a synthetic fiber such as nylon to form a liquid crystal aligning film. The exposure of the coating to radiation may be carried out after post-baking of the coating or the rubbing treatment.

The above-described substrate is selected from transparent substrates formed of glass such as float glass and soda glass, and plastic films of polyethylene terephthalate, polybutylene terephthalate, polyethersulfone, polycarbonate and the like.

The above-described transparent electrically conductive film is selected from an NESA film composed of $SnO_2$ and an ITO film composed of $In_2O_3$-$SnO_2$ and the like. The patterning of this transparent electrically conductive film is carried out by a photo-etching method or a method preliminarily using a mask.

Before the application of the liquid crystal aligning agent, a silane coupling agent or titanium coupling agent may be preliminarily applied onto the substrate and the transparent electrically conductive film to further improve the adhesion of the substrate and the transparent electrically conductive film to the coating.

Preferably, two substrates on each of which the liquid crystal aligning film with a pattern having the difference of pretilt angles in one pixel is formed are positioned such that the liquid crystal aligning films face each other with their rubbing directions at right angles or in antiparallel, and further that high pretilt angle domains and low pretilt angle domains of the films face each other between the upper and lower substrates, the marginal areas between the substrates are sealed with a sealing agent, a liquid crystal is filled, and the filling hole is sealed to form a liquid crystal cell. Polarizers are attached to both sides of the liquid crystal cell in such a manner that the polarization direction of each is in agreement, or at right angles, with the rubbing direction of each liquid crystal aligning film. Thus, a liquid crystal display device is produced.

As the sealing agent, there may be used an epoxy resin containing a curing agent and aluminum oxide particles as a spacer.

As the liquid crystal, nematic liquid crystals and smectic liquid crystals are used. Of these, nematic liquid crystals are preferred. The liquid crystal is selected from Schiff-based liquid crystal, azoxy liquid crystal, biphenyl liquid crystal, phenylcyclohexane liquid crystal, ester liquid crystal, terphenyl liquid crystal, biphenylcyclohexane liquid crystal, pyrimidine liquid crystal, dioxane liquid crystal, bicyclooctane liquid crystal, cubane liquid crystal and the like. Further, the liquid crystal may contain cholesteric liquid crystal such as cholesteryl chloride, cholesteryl nonate and cholesteryl carbonate and such a commercially available chiral agent as C-15 and CB-15 (trade name, manufactured by Merck Ltd.). Further, a ferroelectric liquid crystal such as p-desiloxybenzylidene-p-amino-2-methylbutyl cinnamate may be used.

The polarizer attached to the outside of the liquid crystal cell is selected from a polarizer obtained by stretching to orient a polyvinyl alcohol with allowing it to absorb iodine to form a polarizing film that is called as an H film and then sandwiching the polarization film between cellulose acetate protection films and a polarizer formed of the H film only.

According to the present invention, a liquid crystal aligning film in which pretilt angle can be changed by radiation with a small radiation energy can be obtained and a liquid crystal display device with a wide view angle which is excellent in reliability can be easily obtained by exposing the liquid crystal aligning film selectively to radiation. The aligning film is exposed to radiation and receives its energy, whereby the surface state of the aligning film undergoes a change with the result of a change in pretilt angle.

The most suitable radiation for the liquid crystal aligning agent of the present invention are an ultraviolet ray and laser beam thereof. To obtain a pretilt angle difference of 2" which can control alignment well, a radiation quantity of 20 J/cm² or more (metal halide lamp, 365 nm) has been required conventionally. On the other hand, with an aligning film which is formed from the liquid crystal aligning agent of the present invention, the required radiation quantity is reduced to 10 J/cm² or less, thus making it possible to produce a liquid crystal display device with a wide view angle very efficiently. Since the liquid crystal display device thus produced does not require a photolithography process, it does not suffer from an adverse effect on the characteristics of its liquid crystal and, hence, has excellent reliability.

The present invention will be explained in further detail with reference to Examples. However, the present invention shall not be limited to these Examples.

The measurement of pretilt angles described in Examples were carried out by a crystal rotation method using an He-Ne laser light in accordance with the method described in T. J. Scheffer, et al., J. Appl. Phys., 19, 2013 (1980).

Liquid crystal cells were evaluated on their aligning property as follows: While a voltage was turned on and off, the liquid crystal cells were observed through a polarization microscope to see whether or not an abnormal domain was present. When no abnormal domain was present, such cells were taken as being good.

Figure 6:
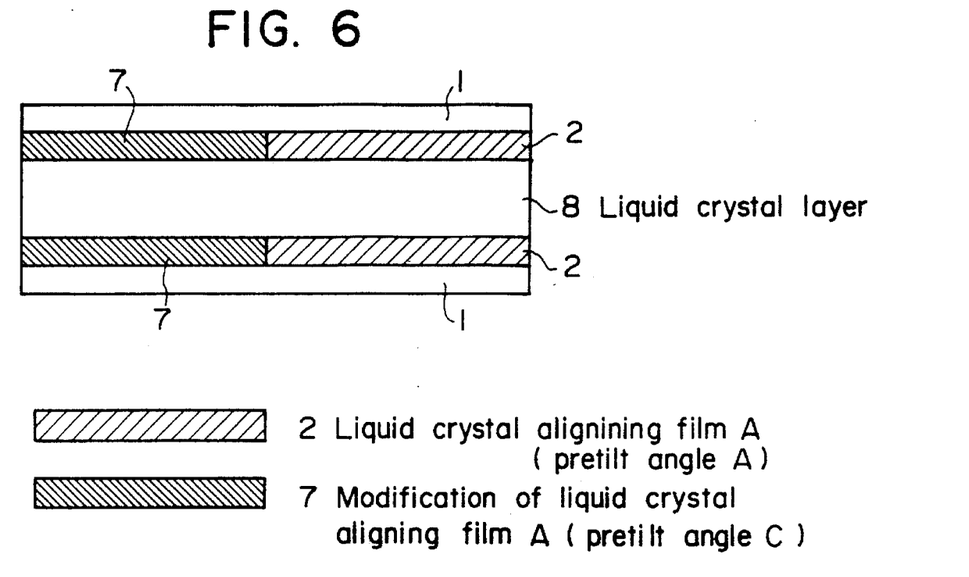
FIG. 6 is a sectional view of a liquid crystal display device used for the measurement of pretilt angle.

The measurement of pretilt angle was carried out using a liquid crystal cell which was prepared by laminating two substrates in such a manner that their rubbing directions are in antiparallel and high pretilt angle domains face each other and low pretilt angle domains also face each other between the two substrates (see FIG. 6).

Figure 7:
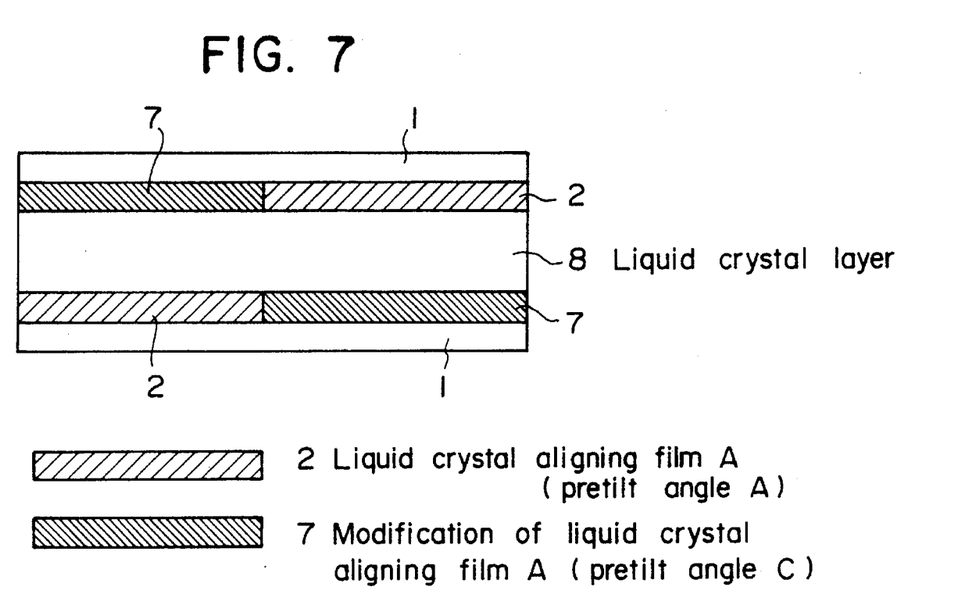
FIG. 7 is a sectional view of a liquid crystal display device used for the measurement of aligning property.

The evaluation of aligning property was carried out using a liquid crystal cell which was prepared by laminating two substrates in such a manner that their rubbing directions are at right angles and each of high pretilt angle domains faces each of low pretilt angle domains between the two substrates (see FIG. 7).

SYNTHESIS EXAMPLE 1

29.80 g of 2,3,5-tricarboxycyclopentylacetate dianhydride (to be referred to as "acid anhydride" hereinafter), 14.16 g of p-phenylenediamine, and 1.04 g of a diamine represented by the above formula (8) were dissolved in 405 g of N-methyl2-pyrrolidone, and the mixture was allowed to react at 60° C. for 6 hours.

The reaction mixture was then poured into a large excess of methanol to precipitate a reaction product. Thereafter, the reaction product was washed with methanol and dried under reduced pressure at 40° C. for 15 hours to give 40.35 g of the specific polymer I (Ia) having an intrinsic viscosity of 1.06 dl/g.

SYNTHESIS EXAMPLE 2

To 40.00 g of the specific polymer I (Ia) obtained in Synthesis Example 1 was added 800 g of N-methyl-2-pyrrolidone, 52.58 g of pyridine and 40.71 g of acetic anhydride, and the mixture was subjected to an imidation reaction at 115° C. for 4 hours.

Thereafter, the reaction product solution was subjected to precipitation in the same manner as in Synthesis Example 1 to obtain 35.65 g of the specific polymer II (IIa) having an intrinsic viscosity of 1.08 dl/g.

SYNTHESIS EXAMPLE 3

The procedure of Synthesis Example 1 was repeated except that the amount of the acid anhydride was changed to 28.58 g, the amount of p-phenylenediamine was changed to 13.10 g and the amount of the diamine represented by the above formula (8) was changed to 3.32 g to give a specific polymer I (Ib). Further, an imidation reaction was carried out using this specific polymer I (Ib) in the same manner as in Synthesis Example 2 to obtain 36.30 g of the specific polymer II (IIb) having an intrinsic viscosity of 0.99 dl/g.

SYNTHESIS EXAMPLE 4

The procedure of Synthesis Example 1 was repeated except that the amount of the acid anhydride was changed to 27.00 g, the amount of p-phenylenediamine was changed to 11.72 g and the amount of the diamine represented by the above formula (8) was changed to 6.28 g to procure a specific polymer I (Ic). Further, an imidation reaction was carried out using this specific polymer I (Ic) in the same manner as in Synthesis Example 2 to obtain 36.55 g of the specific polymer II (IIc) having an intrinsic viscosity of 0.94 dl/g.

SYNTHESIS EXAMPLE 5

The procedure of Synthesis Example 1 was repeated except that 26.24 g of the acid anhydride, 10.13 g of p-phenylenediamine, 6.10 g of the diamine represented by the above formula (8) and 2.53 g of 4,4'-diaminodiphenylsulfide as diamines were used, to give a specific polymer I (Id). Further, an imidation reaction was carried out using this specific polymer I (Id) in the same manner as in Synthesis Example 2 to obtain 35.43 g of the specific polymer II (IId) having an intrinsic viscosity of 0.92 dl/g.

SYNTHESIS EXAMPLE 6

The procedure of Synthesis Example 1 was repeated except that 20.05 g of the acid anhydride, 13.30 g of 4,4'-diaminodiphenylmethane and 11.65 g of the diamine represented by the above formula (8) as diamines were used to give a specific polymer I (Ie). Further, an imidation reaction was carried out using this specific polymer I (Ie) in the same manner as in Synthesis Example 2 to obtain 36.07 g of the specific polymer II (IIe) having an intrinsic viscosity of 0.91 dl/g.

SYNTHESIS EXAMPLE 7

The procedure of Synthesis Example 1 was repeated except that 25.12 g of the acid anhydride, 4.85 g of p-phenylenediamine, 9.20 g of 2,3,5,6-tetramethyl-1,4-diaminobenzene and 5.84 g of the diamine represented by the above formula (8) as diamines were used to give a specific polymer I (If). Further, an imidation reaction was carried out using this specific polymer I (If) in the same manner as in Synthesis Example 2 to obtain 36.60 g of the specific polymer II (IIf) having an intrinsic viscosity of 0.99 dl/g.

SYNTHESIS EXAMPLE 8

The procedure of Synthesis Example 1 was repeated except that 19.25 g of the acid anhydride, 14.57 g of 3,3'-dimethyl-4,4'-diaminodiphenylmethane and 11.18 g of the diamine represented by the above formula (8) as diamines were used to give a specific polymer I (Ig). Further, an imidation reaction was carried out using this specific polymer I (Ig) in the same manner as in Synthesis Example 2 to obtain 35.30 g of the specific polymer II (IIg) having an intrinsic viscosity of 0.94 dl/g.

SYNTHESIS EXAMPLE 9

The procedure of Synthesis Example 1 was repeated except that 23.47 g of the acid anhydride, 7.36 g of p-phenylenediamine, 8.18 g of the diamine represented by the above formula (4) and 6.00 g of the diamine represented by the formula (8) as diamines were used to give a specific polymer I (Ih). Further, an imidation reaction was carried out using this specific polymer I (Ih) in the same manner as in Synthesis Example 2 to obtain 35.44 g of the specific polymer II (IIh) having an intrinsic viscosity of 0.96 dl/g.

SYNTHESIS EXAMPLE 10

The procedure of Synthesis Example 1 was repeated except that 29.98 g of the acid anhydride, 13.42 g of p-phenylenediamine, 1.35 g of the diamine represented by the formula (8) and 1.25 g of n-hexadecylamine as diamines were used to give a specific polymer I (Ii). Further, an imidation reaction was carried out using this specific polymer I (Ii) in the same manner as in Synthesis Example 2 to obtain 34.85 g of the specific polymer II (IIi) having an intrinsic viscosity of 0.93 dl/g.

SYNTHESIS EXAMPLE 11

The procedure of Synthesis Example 1 was repeated except that 28.74 g of the acid anhydride, 13.17 g of p-phenylenediamine as a diamine and 3.09 g of n-hexadecylamine as a monoamine were used to give a specific polymer I (Ij). Further, an imidation reaction was carried out using this specific polymer I (Ij) in the same manner as in Synthesis Example 2 to obtain 34.08 g of the specific polymer II (IIj) having an intrinsic viscosity of 0.89 dl/g.

SYNTHESIS EXAMPLE 12

The procedure of Synthesis Example 1 was repeated except that 26.14 g of 5-(2,5-dioxotetrahydrofural)-3-methyl-3-cyclohexene-1,2-dicarboxylic dianhydride as an acid anhydride, 8.56 g of p-phenylenediamine and 10.30 g of the diamine represented by the above formula (8) as diamines were used to give a specific polymer I (Ik). Further, an imidation reaction was carried out using this specific polymer I (Ik) in the same manner as in Synthesis Example 2 to procure 34.90 g of the specific polymer II (IIk) having an intrinsic viscosity of 0.88 dl/g.

SYNTHESIS EXAMPLE 13

The procedure of Synthesis Example 1 was repeated except that 27.52 g of 1,3,3a,4,5,9b-hexahydro-5-tetrahydro-2,5-dioxo-3-furanyl)-natphtho[1,2-c]-furan-1,3-dione as an acid anhydride, 7.93 g of p-phenylenediamine and 9.55 g of the diamine represented by the above formula (8) as diamines were used to give a specific polymer I (Il). Further, an imidation reaction was carried out using this specific polymer I (Il) in the same manner as in Synthesis Example 2 to obtain 34.30 g of the specific polymer II (III) having an intrinsic viscosity of 0.87 dl/g.

SYNTHESIS EXAMPLE 14

The procedure of Synthesis Example 1 was repeated except that 25.45 g of bicyclo[2,2,2]-octo-7-ene-2,3,5,6-tetracarboxylic dianhydride as an acid anhydride, 8.87 g of p-phenylenediamine and 10.68 g of the diamine represented by the above formula (8) as diamines were used to give a specific polymer I (Im). Further, an imidation reaction was carried out using this specific polymer I (Im) in the same manner as in Synthesis Example 2 to obtain 36.51 g of the specific polymer II (IIm) having an intrinsic viscosity of 0.86 dl/g.

SYNTHESIS EXAMPLE 15

The procedure of Synthesis Example 1 was repeated except that 32.78 g of the acid anhydride, 7.91 g of p-phenylenediamine and 4.32 g of 3,5-diamino-4'-trifluoromethylbenzanilide as diamines were used to give a specific polymer I (In). Further, an imidation reaction was carried out using this specific polymer I (In) in the same manner as in Synthesis Example 2 to obtain 36.40 g of the specific polymer II (IIn) having an intrinsic viscosity of 0.91 dl/g.

SYNTHESIS EXAMPLE 16

The procedure of Synthesis Example 1 was repeated except that 32.78 g of the acid anhydride, 7.91 g of p-phenylenediamine and 4.32 g of 3,5-diamino-3'-trifluoromethylbenzanilide as diamines were used to give a specific polymer I (Io). Further, an imidation reaction was carried out using this specific polymer I (Io) in the Same manner as in Synthesis Example 2 to obtain 36.45 g of the specific polymer II (IIo) having an intrinsic viscosity of 0.89 dl/g.

SYNTHESIS EXAMPLE 17

The procedure of Synthesis Example 1 was repeated except that 15.14 g of the acid anhydride, 2.74 g of p-phenylenediamine and 27.12 g of 2,2-bis[4-(4-amino-2-trifluoromethylphenoxy)phenyl]hexafluoropropane as diamines were used to give a specific polymer I (Ip). Further, an imidation reaction was carried out using this specific polymer I (Ip) in the same manner as in Synthesis Example 2 to obtain 36.54 g of the specific polymer II (IIp) having an intrinsic viscosity of 0.92 dl/g.

SYNTHESIS EXAMPLE 18

The procedure of Synthesis Example 1 was repeated except that 25.94 g of the acid anhydride, 9.39 g of p-phenylenediamine and 9.67 g of 2,2-bis(4-aminophenyl)hexafluoropropane as diamines were used to give a specific polymer I (Iq). Further, an imidation reaction was carried out using this specific polymer I (Iq) in the same manner as in Synthesis Example 2 to obtain 36.00 g of the specific polymer II (IIq) having an intrinsic viscosity of 0.92 dl/g.

SYNTHESIS EXAMPLE 19

The procedure of Synthesis Example 1 was repeated except that 25.54 g of 1,2,3,4-cyclobutanetetracarboxylic dianhydride as an acid anhydride, 12.68 g of p-phenylenediamine and 6.78 g of the diamine represented by the above formula (8) as diamines were used to give 39.76 g of a specific polymer I(Ir).

SYNTHESIS EXAMPLE 20

The procedure of Synthesis Example 1 was repeated except that 21.51 g of 1,2,3,4-cyclobutanetetracarboxylic dianhydride as an acid anhydride, and 5.93 of p-phenylenediamine and 17.5 g of 4,4'-diamino-2,2'-bis(trifluoromethyl)biphenyl as diamines were used to produce 40.12 g of a specific polymer I(Is).

SYNTHESIS EXAMPLE 21

The procedure of Synthesis Example 1 was repeated except that 14.55 g of 1,2,3,4-cyclobutanetetracarboxylic dianhydride as an acid anhydride, and 30.45 g of 2,2-bis[4-(4-aminophenoxy)phenyl]propane as a diamine to give 39.11 g of a specific polymer I(It).

SYNTHESIS EXAMPLE 22

The procedure of Synthesis Example 1 was repeated except that 14.46 g of 1,2,3,4-cyclobutanetetracarboxylic dianhydride as an acid anhydride, 28.76 g of 2,2-bis[4-(4-aminophenoxy)phenyl]propane as a diamine, and 1.78 g of n-hexadecylamine as a monoamine were used to give 40.54 g of a specific polymer I(Iu).

SYNTHESIS EXAMPLE 23

The procedure of Synthesis Example 1 was repeated except that 28.30 g of pyromellitic dianhydride as an acid anhydride, and 13.33 g of p-phenylenediamine and 3.34 g of the diamine represented by the above formula (7) as diamines were used to give 39.76 g of a specific polymer I(Iv).

SYNTHESIS EXAMPLE 24

The procedure of Synthesis Example 1 was repeated except that 26.99 g of pyromellitic dianhydride as an acid anhydride, 12.04 g of p-phenylenediamine as a diamine, and 5.97 g of n-hexadecylamine as a monoamine were used to give 39.77 g of a specific polymer I(Iw).

SYNTHESIS EXAMPLE 25

The procedure of Synthesis Example 1 was repeated except that 22.70 g of pyromellitic dianhydride as an acid anhydride, and 5.63 g of p-phenylenediamine and 16.67 g of 4,4'-diamino-2,2'-bis(trifluoromethyl)biphenyl as diamines were used to give 40.16 g of a specific polymer I(Ix).

SYNTHESIS EXAMPLE 26

The procedure of Synthesis Example 1 was repeated except that 23.38 g of pyromellitic dianhydride as an acid anhydride, and 5.80 g of p-phenylenediamine and 15.82 g of 3,5-diamino-3'-trifluoromethylbenzanilide as diamines were used to give 40.22 g of a specific polymer I(Iy).

EXAMPLE 1

5 g of the specific polymer (IIa) obtained in Synthesis Example 2 was dissolved in 120 g of γ-butyrolactone to prepare a solution having a solid content of 4% by weight. This solution was filtered with a filter having a mesh of 1 μm to obtain a solution of a liquid crystal aligning agent.

The above-obtained solution was applied onto the transparent electrode side of each of two glass substrates having a transparent electrode of an ITO film with a spinner at a spinning rate of 3,000 rpm for 3 minutes, and pre-baked at 100° C. for 30 seconds.

Subsequently, the substrates were exposed to an ultraviolet ray (light intensity of 10 J/cm$^2$ at a wavelength of 365 nm) generated from a metal halide lamp as a light source through a 3×3 cm pattern mask for a liquid crystal display device for measurement of pretilt angle and a 100×100 μm pattern mask for a liquid crystal display device for measurement of aligning property. Thereafter, the substrates were post-baked at 180° C. for 1 hour to form 0.05 μm thick coating films. The amount of the specific structural unit II in the polymer forming the coating films was 92 mol %.

The coating films were subjected to a rubbing treatment with a rubbing machine having a roll with a piece of nylon cloth having pile compression of 0.6 mm put around it at a roll rotation rate of 500 rpm, and a stage movement rate of 1 cm/second. Thereafter, the coating films were washed with an isopropyl alcohol vapor to produce substrates having liquid crystal aligning films with a pattern having the difference of pretilt angles in one pixel.

Then, an epoxy resin adhesive containing aluminum oxide particles having a diameter of 17 μm was applied onto the marginal areas of the rubbing-treated liquid crystal alining film side of each substrate by screen printing. Then, these two substrates were attached to each other under pressure so that the liquid crystal aligning film surfaces faced each other, and the adhesive was cured.

Then, a nematic liquid crystal (MLC-2001 manufactured by Merck) was charged into a space between the substrates from a liquid crystal filling hole, and the hole was sealed with an epoxy adhesive. Polarizers were attached to the both outside surfaces of the substrates such that the polarization direction of each polarizer was in agreement with the direction of rubbing of the corresponding liquid crystal aligning film to produce a liquid crystal display device.

When the thus produced liquid display device was measured for pretilt angle, it was found that there was a large difference in pretilt angle due to exposure to an ultraviolet ray, i.e., the pretilt angle at exposed domains was 0.7°, while that at unexposed domains was 3.5°. The aligning property of the liquid crystal display device was good at both domains.

EXAMPLE 2

The liquid crystal aligning film obtained in Example 1 was used to prepare a liquid crystal display device.

Figure 8:
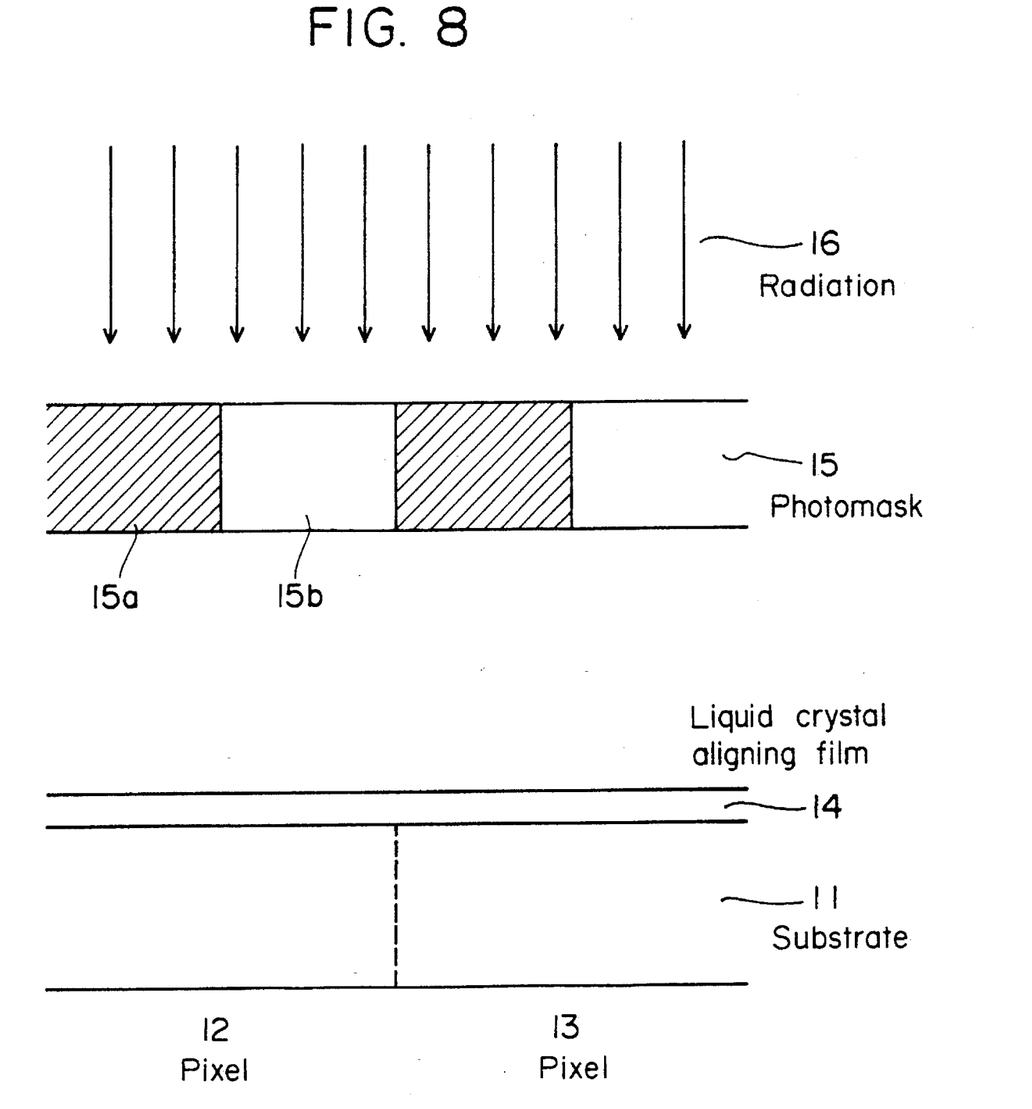
FIG. 8 is a diagram explaining the procedure of forming a liquid crystal display device using a liquid crystal aligning film in the embodiment of the present invention.

As shown in FIG. 8, pixel domains 12 and 13 were formed in the substrate 11 and covered with the liquid crystal aligning film 14. A mask 15 for use in the radiation exposure step which will be described hereinafter was disposed at a position facing the surface of the substrate. According to this Example, the pixel domains 12 and 13 were first formed in the substrate 1 by a conventional method. Then, a liquid crystal aligning film 14 was formed over the entire surface of the substrate 11 to cover the pixel domains 12 and 13. In this Example, the liquid crystal aligning agent obtained in Example 1 was used as the liquid crystal aligning film 14 to form a 0.05 μm thick liquid crystal aligning film. The amount of the specific structural unit II in the polymer forming the liquid crystal aligning film was 92 mol %. After pre-baking, the coating film of the liquid crystal aligning agent was subjected to a rubbing treatment. Thereafter, the liquid crystal aligning film 14 was exposed to radiation 16. This exposure step to radiation 16 can be carried out at any time after the formation of a liquid crystal aligning film, i.e., after the step of applying the liquid crystal aligning agent, the step of pre-baking, the step of post-baking and the step of rubbing.

In the case of radiation exposure using the mask 15, 15a indicated by oblique lines represents shading domains which do not transmit the radiation 16 and 15b indicated without oblique lines represents shading domains which transmit the radiation 16. The transmission domains face part of the pixel domains. A mask similar to a commonly used photomask can be used as the mask 15, or converged radiation may be irradiated onto desired domains of the substrate without using a mask.

As the radiation irradiated onto the liquid crystal aligning film 14, an ultraviolet ray was used in this Example.

After both of the upper and lower substrates constituting a liquid crystal display device were exposed to radiation, the two substrates were laminated together in such a manner that the exposed domains and the unexposed domains face each other. Since unexposed domains, that were high pretilt angle domains, control the aligning direction in each of the pixel domains, both normal and reverse view directions can be formed in each pixel. The thus obtained liquid crystal display device was free from a reversal phenomenon in both of the normal and reverse view directions and a sharp reduction in contrast, and had a wide view angle at 80° compared with a conventional view angle of 45°.

EXAMPLES 3 TO 18

The procedure of Example 1 was repeated except that the specific polymers IIb to IIq obtained in Synthesis Examples 3 to 18 were used to prepare liquid crystal display devices. The liquid crystal display devices were measured for aligning property and pretilt angle at exposed domains and unexposed domains. Results are shown in Table 1.

EXAMPLES 19 TO 23

The procedure of Example 1 was repeated except that the specific polymers Ir to Iv obtained in Synthesis Examples 19 to 23 were used, exposure was carried out at 250° C. for 1 hour after post-baking, and a nematic liquid crystal (ZLI-2293 manufactured by Merck) was used to prepare liquid crystal display devices. The liquid crystal display devices were measured for aligning property and pretilt angle. Results are shown in Table 2.

TABLE 1

| Example | Specific polymer II | Aliphatic/alicyclic hydrocarbon-containing group | | | Pretilt angle (°) | | Liquid crystal aligning property | Amount of specific structural unit II (*) |
|---|---|---|---|---|---|---|---|---|
| | | Dianhydride | Diamine | Terminal | Exposed portion | Unexposed portion | | |
| 3 | IIb | O | O | — | 0.9 | 7.0 | good | 93 |
| 4 | IIc | O | O | — | 2.3 | 10.5 | same as above | 94 |
| 5 | IId | O | O | — | 1.8 | 9.8 | same as above | 89 |
| 6 | IIe | O | O | — | 2.5 | 10.4 | same as above | 93 |
| 7 | IIf | O | O | — | 2.3 | 8.2 | same as above | 85 |
| 8 | IIg | O | O | — | 2.0 | 6.9 | same as above | 78 |
| 9 | IIh | O | O | — | 2.0 | 7.0 | same as above | 92 |
| 10 | IIi | O | O | O | 1.5 | 9.2 | same as above | 92 |
| 11 | IIj | O | — | O | 2.0 | 5.4 | same as above | 95 |
| 12 | IIk | O | O | — | 2.4 | 6.0 | same as above | 100 |
| 13 | IIl | O | O | — | 2.5 | 5.9 | same as above | 87 |
| 14 | IIm | O | — | — | 2.7 | 6.3 | same as above | 100 |
| 15 | IIn | O | — | — | 2.4 | 6.9 | same as above | 98 |
| 16 | IIo | O | — | — | 2.1 | 4.2 | same as above | 80 |
| 17 | IIp | O | — | — | 1.4 | 3.5 | same as above | 75 |
| 18 | IIq | O | — | — | 0.9 | 3.0 | same as above | 99 |

(Note)
*This amount is the amount (mol %) of the specific structural unit II in the polymer forming the liquid crystal aligning film

TABLE 2

| Example | Specific polymer II | Aliphatic/alicyclic hydrocarbon-containing group | | | Pretilt angle (°) | | Liquid crystal aligning property | Amount of specific structural unit II (*) |
| --- | --- | --- | --- | --- | --- | --- | --- | --- |
| | | Dianhydride | Diamine | Terminal | Exposed portion | Unexposed portion | | |
| 19 | Ir | O | O | — | 0.4 | 8.3 | good | 90 |
| 20 | Is | O | — | — | 0.7 | 7.5 | same as above | 85 |
| 21 | It | O | — | — | 0.4 | 4.1 | same as above | 90 |
| 22 | Iu | O | — | O | 0.5 | 6.8 | same as above | 96 |
| 23 | Iv | — | O | — | 3.5 | 8.5 | same as above | 94 |

(Note)
*The definition given in Table 1 is also applied to Table 2.

COMPARATIVE EXAMPLE 1

The procedure of Examples 19 to 23 was repeated except that the specific polymer I (Iw) obtained in Synthesis Example 24 was used to prepare a liquid crystal display device. When the liquid crystal display device was measured for pretilt angle, it was found that there was a small difference in pretilt angle due to exposure to an ultraviolet ray, i.e., the pretilt angle at exposed domains was 4.6° and that at unexposed domains was 5.5°. As a consequence, a desired domain-division alignment type liquid crystal display device could not be obtained.

COMPARATIVE EXAMPLE 2

The procedure of Examples 19 to 23 was repeated except that the specific polymer I (Ix) obtained in Synthesis Example 25 was used to prepare a liquid crystal display device. When the liquid crystal display device was measured for pretilt angle, it was found that there was a small difference in pretilt angle due to exposure to an ultraviolet ray, i.e., the pretilt angle at exposed domains was 5.3° and that at unexposed domains was 5.1°. As a consequence, a desired omain-division alignment type liquid crystal display device could not be obtained.

COMPARATIVE EXAMPLE 3

The procedure of Examples 19 to 23 was repeated except that the specific polymer I (Iy) obtained in Synthesis Example 26 was used to prepare a liquid crystal display device. When the liquid crystal display device was measured for pretilt angle, it was found that there was a small difference in pretilt angle due to exposure to an ultraviolet ray, i.e., the pretilt angle at exposed domains was 7.2° and that at unexposed domains was 7.0°. As a consequence, a desired domain-division alignment type liquid crystal display device could not be obtained.

The liquid crystal aligning agent of the present invention makes it possible to obtain a liquid crystal aligning film suitable for the production of a domain-divided alignment type TN-STN display device which exhibits excellent liquid crystal aligning property and a large change in pretilt angle with a small radiation energy, and has a wide view angle.

A liquid crystal display device having a liquid crystal aligning film formed from the liquid crystal aligning agent of the present invention can be suitably used in SH (super homeotropic), ferroelectric and antiferroelectric liquid crystal display devices by selecting a liquid crystal used.

Further, a liquid crystal display device having an aligning film formed from the liquid crystal aligning agent of the present invention is excellent in liquid crystal aligning property and reliability, and can be effectively used as a display device for a wide variety of devices and machines such as a desktop calculator, a watch, a clock, a digital display device, a wordprocessor, a personal computer and liquid crystal television set, and the like.

What is claimed is:

1. A liquid crystal aligning film which comprises a polymer, said polymer comprising at least one structural unit selected from the group consisting of a structural unit represented by the following formula (1):

wherein $R^1$ and $R^2$ are tetravalent and divalent organic groups, respectively, and at least one of the organic groups is an aliphatic or alicyclic hydrocarbon group, or a group containing an aliphatic or alicyclic hydrocarbon group, and a structural unit represented by the following formula (2):

wherein $R^3$ and $R^4$ are tetravalent and divalent organic groups, respectively, and at least one of the organic groups is an aliphatic or alicyclic hydrocarbon group, or a group containing an aliphatic or alicyclic hydrocarbon, which film has been exposed to radiation sufficient to change the pretilt angle of a liquid crystal in contact with said film as compared with a pretilt angle of the liquid crystal in contact with the film before exposure of said film to radiation.

2. A liquid crystal display device having a liquid crystal layer between a pair of substrates and a liquid crystal aligning film between each of the substrates and the liquid crystal layer, wherein at least one of the liquid crystal aligning films is a liquid crystal domain-divided aligning film which comprises a polymer, said polymer comprising at least one structural unit selected from the group consisting of a structural unit represented by the following formula (1):

wherein $R^1$ and $R^2$ are tetravalent and divalent organic groups, respectively, and at least one of the organic groups is an aliphatic or alicyclic hydrocarbon group, or a group containing an aliphatic or alicyclic hydrocarbon group, and a structural unit represented by the following formula (2):

wherein $R^3$ and $R^4$ are tetravalent and divalent organic groups, respectively, and at least one of the organic groups is aliphatic or alicyclic hydrocarbon group, or a group containing an aliphatic or alicyclic hydrocarbon, which domain-divided aligning film has been exposed to radiation sufficient to change the pretilt angle of a liquid crystal in contact therewith compared with the pretilt angle of the liquid crystal in contact with said domain-divided aligning film before exposure to radiation.

3. The liquid crystal display device of claim 2, wherein the liquid crystal domain-divided aligning film is provided in such a manner that the surface state of each domain is different from other domains.

4. A method for producing a liquid crystal alignment substrate which comprises the steps of:

applying a polymer comprising at least one structural unit selected from the group consisting of a structural unit represented by the following formula (1):

wherein $R^1$ and $R^2$ are tetravalent and divalent organic groups, respectively, and at least one of the organic groups is an aliphatic or alicyclic hydrocarbon group, or a group containing an aliphatic or alicyclic hydrocarbon group, and a structural unit represented by the following formula (2):

wherein $R^3$ and $R^4$ are tetravalent and divalent organic groups, respectively, and at least one of the organic groups is aliphatic or alicyclic hydrocarbon group, or a group containing an aliphatic or alicyclic hydrocarbon group, onto a substrate and baking the substrate to form a film; and exposing part or all of the film to radiation sufficient to change the pretilt angle of a liquid crystal in contact with said film as compared with the pretilt angle of the liquid crystal in contact with the film before exposure to radiation.

5. A method for producing a liquid crystal alignment substrate of claim 4, wherein the polymer comprises a structural unit selected from the group consisting of a structural unit represented by formula (1) and a structural unit represented by formula (2) in an amount of 40 to 100 mol % based on total structural units in the polymer.

6. A method for producing a liquid crystal alignment substrate of claim 4, wherein the polymer is selected from the group consisting of a polymer represented by the following formula (A):

wherein $R^1$ and $R^2$ are tetravalent and divalent organic groups, respectively, at least one of the organic groups is an aliphatic or alicyclic hydrocarbon group or a group containing an aliphatic or alicyclic hydrocarbon group, and n is a number of recurring units, and a polymer represented by the following formula (B):

wherein $R^3$ and $R^4$ are tetravalent and divalent organic groups, respectively, at least one of the organic groups is an aliphatic or alicyclic hydrocarbon group or a group containing an aliphatic or alicyclic hydrocarbon group, and n is a number of recurring units.

7. The liquid crystal aligning film of claim 1, wherein the polymer has an intrinsic viscosity of 0.05 to 10 dl/g when measured in N-methylpyrrolidone at 30° C.

8. A method for producing a liquid crystal display device which comprises:

the step of applying onto at least one of a pair of substrates a liquid crystal aligning agent which comprises a polymer selected from the group consisting of a polymer obtained by reacting a tetracarboxylic dianhydride and a diamine at least one of which comprises at least one hydrocarbon group selected from aliphatic and alicyclic groups and a polymer obtained by imidizing the polymer, and baking the coating film to form a liquid crystal aligning film; and the step of exposing part or all of the substrate having the liquid crystal aligning film formed thereon to radiation sufficient to change the pretilt angle of a liquid crystal in contact with said film as compared with the tilt angle of the liquid crystal in contact with the film before exposure to radiation.

9. The film of claim 1, wherein the polymer comprises structural units represented by formula (1).

10. The film of claim 1, wherein the polymer comprises structural units represented by formula (2).

11. The method of claim 4, wherein the polymer comprises structural units represented by formula (1).

12. The method of claim 4, wherein the polymer comprises structural units represented by formula (2).

13. The film as claimed in claim 1, which has been exposed to radiation sufficient to change the pretilt angle from 2 degrees to 10 degrees as compared to the pretilt angled before exposure to radiation.

14. The film as claimed in claim 2, which has been exposed to radiation sufficient to change the pretilt angle from 2 degrees to 10 degrees as compared to the pretilt angle before exposure to radiation.

15. The film as claimed in claim 4, which has been exposed to radiation sufficient to change the pretilt angle from 2 degrees to 10 degrees as compared to the pretilt angle before exposure to radiation.

16. The film as claimed in claim 1, wherein said film has a thickness of from 0.01 to 1 μm.

* * * * *